(12) United States Patent
Halimi et al.

(10) Patent No.: US 10,819,650 B2
(45) Date of Patent: Oct. 27, 2020

(54) DYNAMICALLY ADAPTIVE CLOUD COMPUTING INFRASTRUCTURE

(71) Applicant: RADCOM LTD., Tel Aviv (IL)

(72) Inventors: Alon Halimi, Alon Shvut (IL); Tal Yaniv, Kfar Saba (IL); Tomer Tuvia Ilan, Rosh Haayin (IL)

(73) Assignee: Radcom Ltd., Tel Aviv (IL)

( * ) Notice: Subject to any disclaimer, the term of this patent is extended or adjusted under 35 U.S.C. 154(b) by 0 days.

(21) Appl. No.: 15/867,758

(22) Filed: Jan. 11, 2018

(65) Prior Publication Data

US 2018/0227241 A1 Aug. 9, 2018

Related U.S. Application Data

(60) Provisional application No. 62/456,693, filed on Feb. 9, 2017.

(51) Int. Cl.
| | | |
|---|---|---|
| *H04L 12/801* | (2013.01) | |
| *H04L 12/911* | (2013.01) | |
| *H04L 29/08* | (2006.01) | |
| *G06F 9/455* | (2018.01) | |
| *G06F 9/50* | (2006.01) | |

(52) U.S. Cl.
CPC .............. *H04L 47/70* (2013.01); *G06F 9/455* (2013.01); *G06F 9/45533* (2013.01); *G06F 9/45558* (2013.01); *G06F 9/5077* (2013.01); *H04L 47/781* (2013.01); *H04L 67/10* (2013.01); *H04L 67/306* (2013.01); *G06F 2009/45595* (2013.01)

(58) Field of Classification Search
CPC ................................ H04L 47/70; H04L 47/10
USPC ........................................................ 709/226
See application file for complete search history.

(56) References Cited

U.S. PATENT DOCUMENTS

| | | | |
|---|---|---|---|
| 8,352,941 B1 * | 1/2013 | Protopopov | G06F 9/45558 718/1 |
| 8,443,365 B2 | 5/2013 | Kumar | |
| 8,863,124 B1 | 10/2014 | Aron | |
| 8,869,300 B2 * | 10/2014 | Singh | G06F 21/53 726/27 |
| 8,909,780 B1 * | 12/2014 | Dickinson | G06F 9/45533 709/220 |
| 8,924,542 B1 | 12/2014 | Gabrielson et al. | |
| 8,997,096 B1 * | 3/2015 | Protopopov | G06F 9/45558 709/201 |
| 9,166,947 B1 * | 10/2015 | Tian | H04L 61/255 |
| 9,372,709 B2 | 6/2016 | Ciano et al. | |
| 9,430,295 B1 | 8/2016 | Eizadi et al. | |
| 10,079,797 B2 * | 9/2018 | Uriel | H04L 61/103 |
| 10,171,371 B2 | 1/2019 | Anwar et al. | |
| 2005/0147062 A1 | 7/2005 | Khouaja et al. | |
| 2011/0119382 A1 * | 5/2011 | Shaw, Jr. | G06F 11/3664 709/226 |

(Continued)

OTHER PUBLICATIONS

Wikipedia, "cloud computing", 2019 (Year: 2019).*

(Continued)

*Primary Examiner* — Ondrej C Vostal
(74) *Attorney, Agent, or Firm* — A.C. Entis-IP Ltd.; Allan C. Entis

(57) ABSTRACT

A method of providing an infrastructure of virtual resources in a cloud comprising automatically provisioning the virtual resources with other virtual resources with which to cooperate in supporting the infrastructure functionalities.

19 Claims, 2 Drawing Sheets

(56) References Cited

U.S. PATENT DOCUMENTS

| | | |
|---|---|---|
| 2011/0142053 A1 | 6/2011 | Van Der Merwe et al. |
| 2011/0214176 A1* | 9/2011 | Burch ................. G06F 9/45533 726/15 |
| 2012/0102190 A1 | 4/2012 | Durham et al. |
| 2012/0131468 A1 | 5/2012 | Friedlander et al. |
| 2013/0132545 A1* | 5/2013 | Schultze ................. H04L 41/00 709/223 |
| 2013/0239106 A1* | 9/2013 | Srinivasan ............ G06F 9/5077 718/1 |
| 2013/0268643 A1* | 10/2013 | Chang ................. G06F 9/45558 709/223 |
| 2013/0346619 A1 | 12/2013 | Panuganty et al. |
| 2014/0007089 A1 | 1/2014 | Bosch et al. |
| 2014/0040991 A1 | 2/2014 | Potonniee et al. |
| 2014/0075433 A1* | 3/2014 | Kotton ................ G06F 9/45558 718/1 |
| 2014/0244845 A1* | 8/2014 | Liu ..................... H04L 67/1065 709/226 |
| 2014/0317616 A1 | 10/2014 | Chu |
| 2014/0359134 A1 | 12/2014 | Yoshida |
| 2014/0365549 A1* | 12/2014 | Jenkins ................... G06F 9/526 709/201 |
| 2015/0063166 A1 | 3/2015 | Sif et al. |
| 2015/0106806 A1* | 4/2015 | Reddy .................. G06F 9/5077 718/1 |
| 2015/0178108 A1* | 6/2015 | Tarasuk-Levin .... G06F 9/45558 718/1 |
| 2015/0178110 A1* | 6/2015 | Li ....................... G06F 9/45558 718/1 |
| 2015/0281111 A1* | 10/2015 | Carl ....................... H04L 47/70 709/226 |
| 2015/0350101 A1 | 12/2015 | Sinha et al. |
| 2016/0088096 A1 | 3/2016 | Quiriconi et al. |
| 2016/0134584 A1 | 5/2016 | Lang et al. |
| 2016/0142338 A1 | 5/2016 | Steinder et al. |
| 2016/0330196 A1 | 11/2016 | El Marouani et al. |
| 2016/0359955 A1 | 12/2016 | Gill et al. |
| 2016/0380817 A1 | 12/2016 | Agarwal et al. |
| 2016/0380906 A1 | 12/2016 | Hodique et al. |
| 2017/0005923 A1 | 1/2017 | Babakian |
| 2017/0063673 A1 | 3/2017 | Maskalik et al. |
| 2017/0134307 A1 | 5/2017 | Clarke |
| 2017/0289060 A1 | 10/2017 | Aftab et al. |
| 2017/0293500 A1 | 10/2017 | Molina et al. |
| 2017/0329639 A1 | 11/2017 | Morper et al. |
| 2017/0371628 A1 | 12/2017 | Zhao et al. |
| 2018/0046482 A1 | 2/2018 | Karve et al. |
| 2018/0084084 A1 | 3/2018 | Sharma |
| 2018/0191859 A1 | 7/2018 | Sharma et al. |
| 2018/0205600 A1 | 7/2018 | Burton et al. |
| 2018/0287938 A1 | 10/2018 | Han |
| 2018/0341768 A1* | 11/2018 | Marshall ................. G06F 21/53 |
| 2019/0394658 A1 | 12/2019 | Baillargeon |

OTHER PUBLICATIONS

Merriam-Webster, "role", 2019 (Year: 2019).*
U.S. Final Office Action dated Aug. 6, 2019 for related U.S. Appl. No. 15/708,176, filed Sep. 19, 2017.
TechTerms, "template", 2019 (Year 2019).
U.S. Office Action dated Feb. 21, 2020 for U.S. Appl. No. 15/708,176, filed Sep. 19, 2017.
"Deploying MaveriQ on OpenStack", RADCOM Presentation, Nov. 2016.
Office Action dated Mar. 29, 2019 for U.S. Appl. No. 15/708,176, filed Sep. 19, 2017.
International PCT Search Report dated May 3, 2018 for PCT International Application No. PCT/IL2018/050036 filed Jan. 10, 2018.

* cited by examiner

DYNAMICALLY ADAPTIVE CLOUD COMPUTING INFRASTRUCTURE

The present application claims benefit under 35 U.S.C. 119(e) of U.S. Provisional Application 62/456,693 filed Feb. 9, 2017, the disclosure of which is incorporated herein by reference.

FIELD

Embodiments of the disclosure relate to methods and systems for configuring communications between resources of a cloud application infrastructure.

BACKGROUND

Cloud computing refers to information processing technology that enables a user to realize and use an application for performing information processing tasks without having to provide, maintain, or manipulate, an underlying physical infrastructure on which the application runs. The various resources that are assembled to cooperate in executing Me tasks may be referred to as "virtual resources" (VRs), and their assembly may be referred to as a virtual infrastructure, or a cloud or cloud based infrastructure.

Virtual resources are typically abstract conceptualizations of familiar physical devices, conventionally referred to as "bare-metal" devices or resources. A virtual resource may for example be a virtual computer, generally referred to as a virtual machine (VM), a virtual router, virtual load balancer, virtual agent, "container", or even a virtual network. However, whereas a virtual resource may correspond to a bare metal resource, a virtual resource is a mental construct characterized by functionalities that it is required to provide and parameters that define the virtual resource's capacities to provide the functionalities. And the functionalities and parameters, which are defined by text statements in a suitable language, may not necessarily stand in one to one correspondence with functionalities and parameters of any particular bare-metal device. For example a container may be considered a virtual resource, but it does not correspond to any bare metal resource. While a virtual machine corresponding to a computer has a complete operating system (OS) for running an application or applications it comprises, a container comprises a complete runtime environment—an application plus software components required to execute the application, but does not have an operating system. A container is configured to access and use an "external" host operating system, which it may share with other containers. A container is more akin to an object in object oriented programming than any physical machine. A hypervisor, or in the case of a container a kernel of an external operating system, controls how a virtual resource accesses and uses, subject to constraints of the virtual resource's characterizing functionalities and parameters, physical assets from one or more bare-metal resources that the virtual resource requires to provide its functionalities. The virtual resources in a virtual infrastructure operate and communicate with each other in a virtual environment referred to as a cloud to support an application, which may be referred to as a cloud based application that performs a desired information processing task.

Creating, referred to as "spinning up", and assembling a collection, referred to as a "stack", of virtual resources to provide a virtual, cloud based infrastructure for supporting a cloud application is a complex task. Various enterprises have developed and provide services for automatically or semi-automatically spinning up and configuring, referred to as "orchestrating", virtual resources into cloud based infrastructures. Popular orchestration modules typically operate on templates comprising text statements that describe and define virtual resources and their relationships in a cloud infrastructure to orchestrate cloud based infrastructure. For example, "Heat" provides a template based orchestration module that operates on Heat Orchestration Templates ("HOT" templates) that may be written in YAML (Yet Another Markup Language) to generate cloud applications.

SUMMARY

An aspect of an embodiment of the disclosure relates to providing Orchestration Script for orchestrating a cloud infrastructure that comprises a stack of templates defining virtual resources for the infrastructure. The Orchestration Script comprises a package management system (PMS), comprising an engine referred to as a "Spinneret", having code that is executable to construct, optionally in real time as virtual resources in the infrastructure are instantiated, a virtual communications network over which the virtual resources, may communicate with each other to execute a desired data processing task of the cloud infrastructure. In an embodiment, Spinneret may be configured to monitor, following establishment of the cloud infrastructure, workload of the virtual resources and operate to dynamically scale-out or scale-in, optionally in real time, the infrastructure by respectively adding or retiring resources responsive to increase or decrease in demand for processing capacity. Optionally, Spinneret is configured to provide service discovery and provide a given resource with an alternative IP address and/or port at which the given resource may access a needed service, optionally to replace an IP address and/or port, which might have gone stale as a result for example of configuration changes of the infrastructure due to scale-out, scale-in, or resource malfunction. In an embodiment Spinneret may be configured to provide dynamic upgrading for example by changing a VM compatibility setting that determines virtual hardware available to the VM.

In an embodiment, the Spinneret is configured to receive notifications of instantiations of virtual resources of the infrastructure and register the instantiations in a Spinneret registration database (R-DB). A notification of an instantiation of a resource received by the Spinneret may include an identification (ID) profile of the instantiated virtual resource. A virtual resource ID profile may comprise an internet protocol (IP) address of the virtual resource, and optionally additional ID data, such as by way of example, a name, role, and/or geographical region associated with the virtual resource that may be advantageous in forging, as discussed below, communication links for the virtual network. During orchestration, upon receiving notification of and registering instantiation of a first resource, Spinneret searches the Spinneret R-DB for a second resource registered with Spinneret that provides data accessible at the IP address of the second resource that may be used as input data required by the first resource. If a second resource is found, Spinneret operates to provision the first resource with the IP address of the second resource so that the first resource may communicate with and receive data from the second resource that the first resource requires. In addition to an IP address Spinneret may, optionally provide the first resource with other information characterizing the second resource, such as a listening port and credential information, which the first resource may require but, generally does not and cannot receive during conventional instantiation of virtual resources. If a suitable second resource is not found, Spinneret repeats the search as additional resources are instantiated and registered with Spinneret during orchestration until a suitable second resource is found for the first resource.

By automatically provisioning resources with IP addresses from which they may receive required data during orchestration of a cloud infrastructure, a Spinneret in accordance with an embodiment enables an infrastructure to self-assemble with a communication network that it requires to function. Self-assembly in accordance with an embodiment enhances, ease, efficiency and accuracy with which a cloud infrastructure can be orchestrated to an operational status at which it may be accessed to perform a task for which it is intended, and reduces time it may require to orchestrate the infrastructure, which can take days or hours, to generally less than an hour or substantially less than an hour.

To provide scaling for the established infrastructure Spinneret may comprise a monitoring network of virtual monitoring agents that monitor workloads of virtual resources in the infrastructure and alert Spinneret if the workloads indicate advisability of scaling-out or scaling-in the infrastructure. In response, Spinneret may operate to automatically scale-out or scale-in the infrastructure to harmonize a number, features, and connectivity of the resources to the monitored workloads. Optionally, Spinneret comprises a "push-network" of virtual push agents that are configured to receive upgrade data and push the upgrade data to resources that are selected for upgrading. Optionally, Spinneret automatically identifies available upgrades and selects and implements advantageous upgrades from the identified upgrades for dissemination to and implementation by relevant resources. In an embodiment, a virtual monitoring agent and/or a virtual push agent may be provided in a container.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to FIGURES attached hereto that are listed following this paragraph. Identical features that appear in more than one FIGURE are generally labeled with a same label in all the FIGURES in which they appear. A label labeling an icon representing a given feature of an embodiment of the invention in a FIGURE may be used to reference the given feature. Dimensions of features shown in the figures are chosen for convenience and clarity of presentation and are not necessarily shown to scale.

DETAILED DESCRIPTION

In the following detailed description, flow diagrams outline a procedure by which a Spinneret operates to provide a communications network for a virtual infrastructure in accordance with an embodiment of the disclosure. The virtual infrastructure may comprises any of various different types of virtual resources and may comprise a combination of virtual resources and bare-metal resource.

Figure 1A:
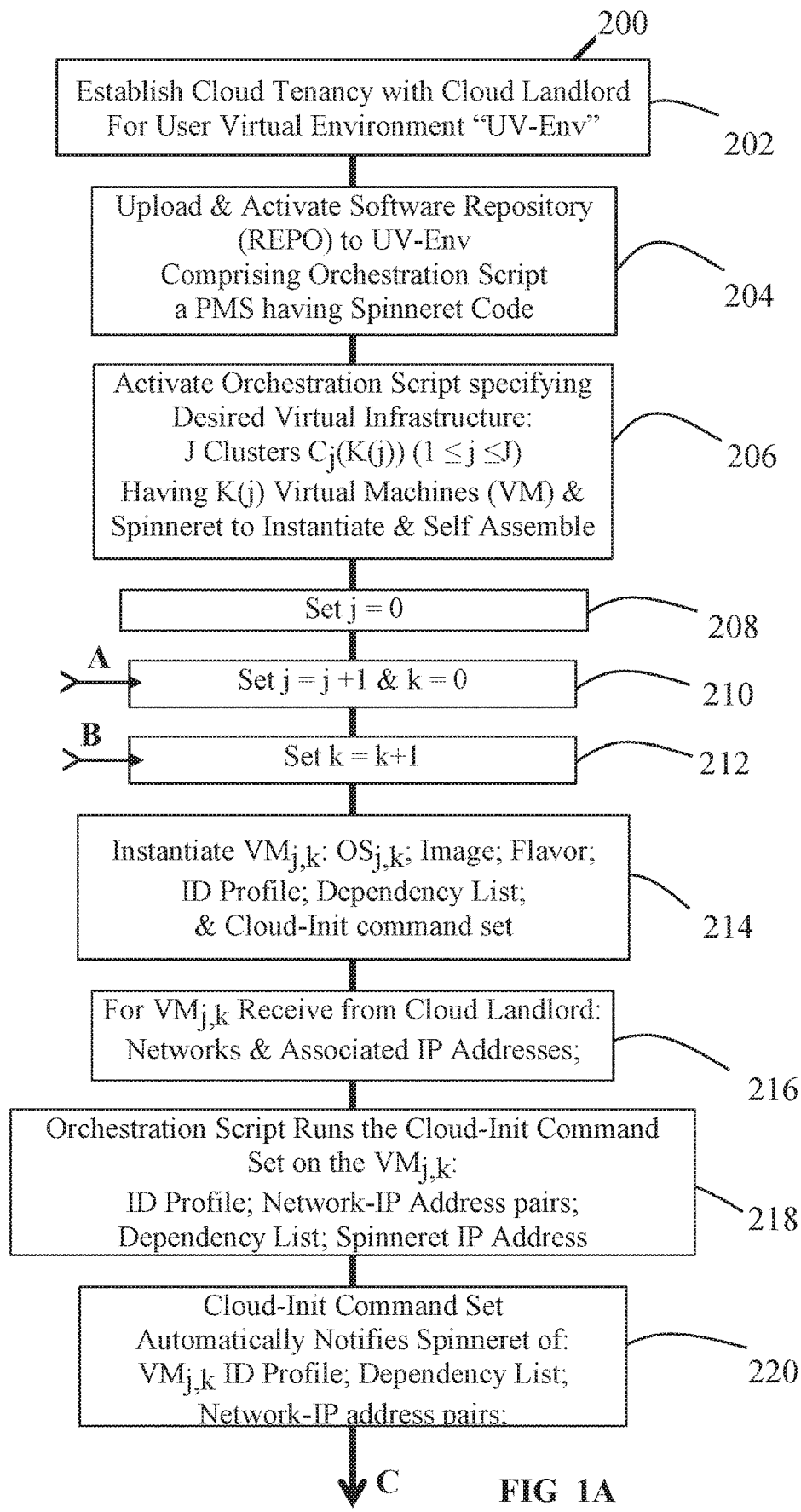
FIGS. 1A and 1B show a flow diagram by which a Spinneret instantiated from a Spinneret template orchestrates a cloud infrastructure comprising a plurality of clusters of virtual machines and a self-assembled communication network, in accordance with an embodiment of the disclosure.
Figure 1B:
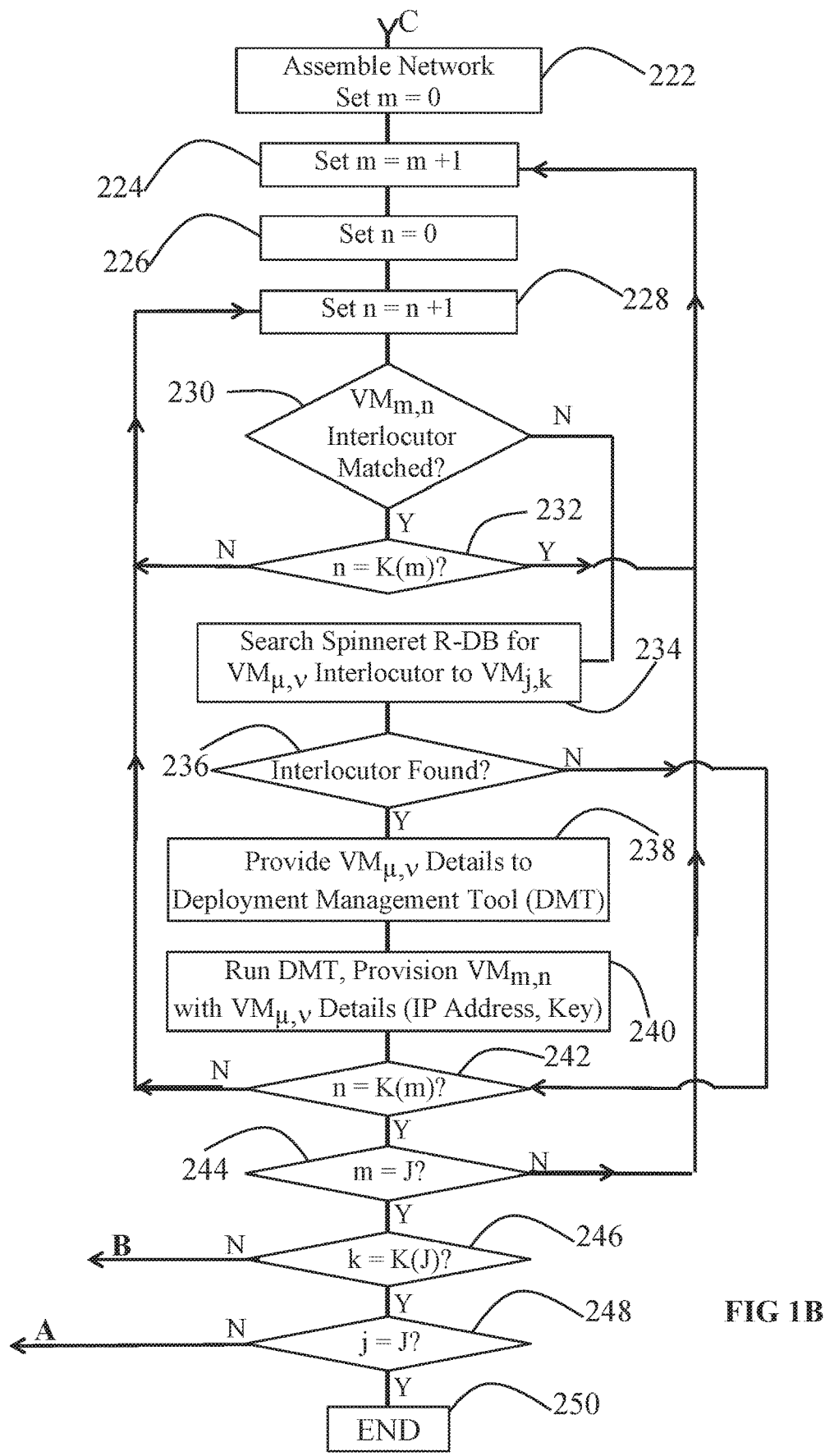

FIGS. 1A and 1B show a flow diagram of a procedure 200 by which Orchestration Script and a Spinneret cooperate to instantiate a virtual infrastructure and construct a communication network over which virtual resources in the virtual infrastructure communicate with each other, in accordance with an embodiment of the disclosure. By way of example, the virtual infrastructure, is assumed, to comprise a plurality of J clusters, $C_j(K(j))$ $1 \leq j \leq J$ of VMs, where a j-th cluster comprises $K(j)$ virtual machines $VM_{j,k}$, $1 \leq k$—$K(j)$ and operation of the Spinneret is discussed with respect to the $VM_{j,k}$. Operation of a Spinneret in accordance with an embodiment of the disclosure with respect VRs other than VMs, and with respect to any of various combinations of different VRs, and VRs and bare-metal resources is similar to operation of the Spinneret with respect to VMs.

In a block 202 a user accesses a public or private cloud owner, a "cloud landlord", to receive authorization to establish tenancy and a user virtual environment "UV-Env" in the landlord's cloud. In a block 204 the user optionally uploads to the UV-Env a software repository (REPO) comprising orchestration script for establishing a virtual infrastructure in the cloud and a package management system (PMS) of software tools including a Spinneret for implementing the orchestration in accordance with an embodiment of the disclosure.

In a block 206 the user activates the orchestration script to instantiate a desired virtual infrastructure comprising $C_j(K(j))$ clusters of virtual machines $VM_{j,k}$, and activates the Spinneret to construct a communication network over which the virtual machines communicate. Upon activation, Spinneret may request and receive an IP address, optionally from the cloud landlord, for use in communicating with VRs in the virtual infrastructure established in user environment UV-Env. In a block 208 the orchestration script sets an index j equal to zero and in a block 210 sets j=(j+1) and initiates the index k to zero. In a block 212 Spinneret increases k to (k+1).

In a block 214 orchestration software spins up a virtual machine $VM_{j,k}$ (initially at this stage with j=k=1) and optionally provides it with an operating system $OS_{j,k}$, image, flavor, an ID profile, dependency list, and a Cloud-Init command set. The ID profile may comprise at least one of or any combination of more than one of a name of the $VM_{j,k}$, a role of $VM_{j,k}$, a dependency list, a geographical region that may be associated with the $VM_{j,k}$, and/or additional data that may be advantageous for determining with which other VMs in the virtual network $VM_{j,k}$ should be in communication. In a block 216 the cloud landlord, assigns $VM_{j,k}$ a network and IP addresses for use in communicating with other VMs in the virtual infrastructure being instantiated, in accordance with an embodiment of the disclosure.

In a block 218 the orchestration script runs the Cloud-Init command set on the $VM_{j,k}$ to initialize the $VM_{j,k}$ with the operating system $OS_{j,k}$, image, flavor, ID profile, and dependency list. In a block 220 the Cloud-Init command set of $VM_{j,k}$ accesses Spinneret via the Spinneret IP address, and automatically notifies Spinneret of the instantiation of $VM_{j,k}$. The notification comprises providing the Spinneret with the network identifier and IP address that the cloud landlord assigned to $VM_{j,k}$, the $VM_{j,k}$ dependency list, and optionally at least some of the data comprised in the ID profile of the $VM_{j,k}$. Spinneret may store the notification information in the Spinneret registration database R-DB.

Optionally, in a block 222 shown in FIG. 1B, Spinneret proceeds to construct a communication network via which $VM_{j,k}$ will communicate with other VMs that the orchestration script spins up to instantiate the desired virtual infrastructure, and in block 222 initializes a cluster search index m to zero. In a block 224 Spinneret increases search index m by one. In a block 226 Spinneret initializes a VM search index n to 0, and in a block 228 increases value of index n by one. In a decision block 230 Spinneret may determine whether $VM_{m,n}$ in the desired virtual infrastructure has been matched to at least one other VM, with which to communicate and receive data that $VM_{m,n}$ requires to perform functionalities that $VM_{m,n}$ is intended to provide to the desired virtual infrastructure. A VM that provides data to $VM_{m,n}$ may be referred to as an interlocutor VM for $VM_{m,n}$. Virtual machine $VM_{m,n}$ may be said to be matched to an interlocutor if $VM_{m,n}$ has an IP address of the interlocutor so that it may access the interlocutor VM for data.

If in decision block 230 Spinneret determines that $VM_{m,n}$ has been matched to all interlocutor VMs from which it may need to receive data, Spinneret may proceed to a decision block 232 to determine if the VM search index n is equal to the maximum number, K(m), of VMs in the m-th cluster $C_m(K(m))$. If n≠K(m) Spinneret returns to block 228 to increase n by one and proceed again to decision block 230. If, on the other hand n=K(m), Spinneret returns to block 224 to increase cluster search index m by one and proceed again from block 226 to decision block 230.

If in decision block 230 Spinneret determines that $VM_{m,n}$ has not been matched to all its interlocutors, Spinneret may proceed to a block 234. In block 234 Spinneret searches the Spinneret database R-DB to locate a virtual machine $VM_{\mu,v}$ that may function as an interlocutor for $VM_{m,n}$. Spinneret may determine whether or not a virtual machine $VM_{\mu,v}$ is an interlocutor for $VM_{m,n}$ based on the dependencies and/or ID profiles of $VM_{m,n}$ and/or $VM_{\mu,v}$.

In a decision block 236, if Spinneret has located an appropriate interlocutor, $VM_{\mu,v}$, in R-DB for $VM_{m,n}$, Spinneret may proceed to a block 238 to run a Deployment Management Tool (DMT) to execute code to provide $VM_{m,n}$ with the IP address of $VM_{\mu,v}$ so that $VM_{m,n}$ may communicate with $VM_{\mu,v}$ and receive data that it needs from $VM_{\mu,v}$.

After running the DMT, Spinneret may proceed to a decision block 242 to determine if VM search index n is equal to the maximum number K(m) of VMs in the m-th cluster $C_m(K(m))$. If n≠K(m), Spinneret may return to block 228 to increase n by one and again proceed through block 230 towards block 242. If, on the other hand n=K(m), Spinneret may proceed to a decision block 244 to determine if cluster search index m is equal to the maximum number J of clusters in the desired virtual infrastructure that Spinneret is spinning up and orchestrating. If m≠J, Spinneret may return to block 224 to increase cluster search index m by one to proceed towards block 244 and search the R-DB for an interlocutors for VMs in cluster (m+1).

If on the other hand, Spinneret finds that m=J in decision block 244, Spinneret may proceed to a decision block 246 to determine if cluster index k is equal to the maximum number K(j) of VMs in the j-th cluster $C_j(K(j))$. If k≠K(j), Spinneret may return to block 212 where the orchestration script operates to increase VM index k by one to spin up virtual machine $VM_{j,(k+1)}$ of cluster $C_j(K(j))$ and proceed towards block 246. If on the other hand in decision block 246 Spinneret determines that k=K(j) Spinneret may proceed to a decision block 248.

In decision block 248 Spinneret may determine whether or not j is equal to J, the maximum number of VR clusters $C_j(K(j))$ to be spun up in the desired virtual infrastructure. If j is less than J, Spinneret may return to block 212 where the orchestration script operates to increase j by one and again proceed towards block 248 and spin up a next cluster $C_{j+1}(K(j+1))$ of virtual machines for the desired virtual infrastructure. If on the other hand in decision block 248 Spinneret has found that j=J, Spinneret has finished its job of providing a communications network for clusters $C_j(K(j))$ 1≤j≤J of the desired infrastructure and connecting the clusters and virtual machines to the communications network so that they may communicate to cooperate in performing the functions of the infrastructure. Spinneret may then proceed to a block 250 to end spinning up and orchestrating the desired infrastructure.

If in decision block 236, Spinneret has not located an appropriate interlocutor, $VM_{\mu,v}$, in R-DB for $VM_{m,n}$, Spinneret may proceed directly to decision block 242 to determine if cluster search index n should be increased as discussed above.

It is noted that in the above description the orchestration script and Spinneret operate to instantiate an infrastructure having initially J clusters $C_j(K(j))$ 1≤j≤J and respectively K(j) virtual resources. Following initial instantiation it may be advantageous to scale-out and increase or scale-in and decrease a number of clusters and/or a number of VRs in a cluster.

In an embodiment, Spinneret comprises a monitoring network of agents, optionally provided as containers, which maintain an awake listening state to monitor and accumulate data based on workloads in the infrastructure after initial instantiation. The monitoring network may periodically report on the state of the infrastructure workload and/or report on the state of the workload with respect to the capacity of the infrastructure when the workload departs an acceptable workload range based on data accumulated by the agents. The monitoring network may provide a state of workload by determining any of various quality of service parameters (QoS). By way of example the QoS parameters may comprise key performance indicators (KPIs), such as CPU loads, memory utilization, and/or latency. In response to determining an aberrant state of the workload, Spinneret may automatically initiate and configure a scaling operation and scale-out and/or scale-in an infrastructure to improve a match of the infrastructure to the workload. An improved match may be determined by an improved value for a QoS parameter.

If Spinneret or another entity initiates a scale-out to add a new VR to the virtual infrastructure, the orchestration script may run the Cloud-Init Command set of the new VR as in block 218 and proceed to block 220 to notify Spinneret of the "arrival" of the new VR. Spinneret may then engage in a service discovery procedure, optionally similarly as described in blocks 222-250, to determine interlocutors for the new VR and provide the new VR with IP addresses of the interlocutors. If Spinneret or another entity initiates a scale out to retire a given VR from the virtual infrastructure, communications connections between the given VR and other VRs in the virtual infrastructure are also retired. As a result some of the remaining VRs may be completely or partially orphaned or deprived of needed input data. In an embodiment of the disclosure Spinneret may operate to reconfigure connections between VRs in the virtual infrastructure by searching its R-DB, optionally similarly as described in blocks 222-250, to locate substitutes for the retired VR and provide the IP addresses of the substitute VRs to the deprived VRs.

Spinneret may be configured to monitor sites that provide data and/or programming upgrades relevant to resources comprised in the virtual infrastructure. Upon receiving notification of a relevant upgrade Spinneret may select the update for dissemination to and implementation by one or more resources in the infrastructure. In an embodiment to effect upgrades as may be needed, Spinneret may comprise a push network of virtual resources, optionally, containers, which may be referred to as "upgrader containers" or simply "upgraders", each comprising an upgrading application configured to manage upgrades for resources in the infrastructure. In an embodiment an upgrader may comprise a dynamic address book operable to receive addresses of resources in the infrastructure for which a given upgrade is intended. The upgrader may disseminate and implement an upgrade by broadcasting the upgrade to the intended resources or sequentially upgrading resources or groups of resources having addresses in the dynamic address book. A given upgrader tasked by Spinneret to upgrade a plurality of resources, may be configured to automatically determine how to implement the upgrades in accordance with a procedure that moderates disturbance to operations of the virtual infrastructure. For example, the upgrader may determine to simultaneously upgrade a portion of the resources intended for upgrading rather than simultaneously upgrade all the resources, so that tasks normally performed by the portion of the resources being upgraded may temporarily be shunted for execution by resources that are not being upgraded.

There is therefore provided in accordance with an embodiment of the disclosure a method of providing an infrastructure of virtual resources in a cloud to support a desired cloud based application, the method comprising: instantiating a virtual management module in the cloud comprising or having access to a memory; instantiating a plurality of virtual resources, each resource operable to provide a functionality for the infrastructure that supports performance of the cloud based application and having an internet protocol (IP) address, and a role, and configured in response to instantiation to transmit to the management module its IP address and role; wherein the management module is configured to: store in the memory the IP addresses and roles that it receives from instantiated virtual resources; search the memory to provide a first instantiated virtual resource with a second instantiated virtual resource with which the first virtual resource may communicate to receive data that the first resource requires to provide the functionality that the first resource provides the infrastructure; and operate to provide the first resource with the IP address of the second resource. Optionally, the management module is configured to provide the first resource with the IP address of the second resource in real time during provision of the infrastructure as virtual resources of the plurality of resources of the infrastructure are instantiated. Additionally or alternatively, the management module is configured to monitor the infrastructure of virtual resources after orchestration of the infrastructure to determine if a resource is added or retired from the infrastructure. Optionally, the management module is configured in response to determining that a virtual resource has been added to the infrastructure, to search the memory to identify an IP address of a virtual resource suitable as an interlocutor for the added virtual resource, and if an interlocutor is found, to provide the interlocutor IP address to the added virtual resource.

In an embodiment operating to provide the first resource with the IP address of the second resource comprises providing a Deployment Management Tool with the IP address of the second resource and running the Deployment Management Tool to provision the first resource with the IP address of the second resource In an embodiment instantiating a plurality of virtual resources comprises instantiating at least one virtual monitoring agent configured to monitor workload of a virtual resource of the plurality of virtual resources and provide the virtual management module with data characterizing the workload. The method may comprise configuring the virtual management module to: determine if the workload characterizing data received from the agent indicates that the workload departs from an acceptable workload range; and if the workload is determined to depart the acceptable workload range initiate a scaling operation to modify the infrastructure and return the workload to an acceptable workload range. Optionally the method comprises configuring the virtual management module to determine if the workload is within an acceptable workload range based on a value of at least one quality of service (QoS) parameter.

In an embodiment, the method comprises instantiating at least one virtual upgrader comprising a dynamic address book configured to receive and store addresses of virtual resources of the plurality of virtual resources and configuring the virtual upgrader to manage an upgrade of a virtual resource having an address in the dynamic memory. Optionally the method comprises configuring the virtual management module to: monitor a site that provides data and/or programming upgrades relevant to virtual resources; select an upgrade from the monitored upgrades relevant to at least one of the plurality of virtual resources in the infrastructure; provide the at least one virtual upgrader with the upgrade and the address of the at least one virtual resource for which the upgrade is relevant; and instruct the at least one virtual upgrader to use the upgrade to upgrade the at least one relevant virtual resource. Optionally providing the at least one virtual upgrade comprises providing the virtual upgrader with information identifying the upgrade and a site at which to receive the upgrade.

In an embodiment the method may comprise configuring the virtual management module to provide service discovery and provide a given resource of the plurality of resources with an alternative or additional IP address and/or port at which the given resource may access a needed service.

In an embodiment the instantiating a virtual management module and a plurality of virtual resources comprises providing a master template having templates for the management module and the virtual resources. Optionally, the templates are Heat Orchestration Templates (HOT).

In an embodiment the plurality of virtual resources comprises at least one virtual machine (VM) and/or at least one container. In an embodiment the infrastructure comprises at least one bare-metal resource.

There is further provided in accordance with an embodiment of the disclosure a cloud based infrastructure comprising: a plurality of virtual resources; and a virtual management module having a memory and configured to: communicate with virtual resources of the plurality of virtual resources after they are instantiated to receive their respective IP addresses and roles; store in the memory IP addresses and roles that it receives; based at least in part on instantiation of a virtual resource of the plurality of virtual resources, search the memory to identify an IP address of a virtual resource suitable to function as an interlocutor for the instantiated virtual resource; and if an interlocutor is found, provide the interlocutor IP address to the instantiated virtual resource. Optionally, the virtual management module is configured to perform the search in real time during orchestration of the infrastructure as virtual resources of the infrastructure are instantiated. Additionally or alternatively, the virtual management module may be configured to monitor the infrastructure after the infrastructure is orchestrated to determine whether a new virtual resource is added to or removed from the infrastructure. Optionally, the virtual management module is configured, upon determining that a new virtual resource has been added to the infrastructure, to search the memory to identify an IP address of a virtual resource suitable to function as an interlocutor for the new virtual resource and if an interlocutor is found, provide the interlocutor IP address to the new virtual resource.

In an embodiment, the plurality of virtual resources comprises at least one virtual monitoring agent configured to monitor workload of a virtual resource of the plurality of virtual resources and provide the virtual management module with data characterizing the workload. Optionally, the virtual management module is configured to: determine if the workload characterizing data received from the agent indicates that the workload departs from an acceptable workload range; and if the workload is determined to depart the acceptable workload range initiate a scaling operation to modify the cloud based infrastructure and return the workload to an acceptable workload range. Optionally, virtual management module is configured to determine if the workload is within an acceptable workload range based on a value of at least one quality of service (QoS) parameter.

In an embodiment the cloud based infrastructure comprises least one virtual upgrader having a dynamic address book configured to receive and store addresses of virtual resources of the plurality of virtual resources and configured to manage an upgrade of a virtual resource having an address in the dynamic memory. In an embodiment the virtual management module is configured to: monitor a site that provides data and/or programming upgrades relevant to virtual resources; select an upgrade from the monitored upgrades relevant to at least one of the plurality of virtual resources in the infrastructure; provide the at least one virtual upgrader with the upgrade and the address of the at least one virtual resource for which the upgrade is relevant; and instruct the at least one virtual upgrader to use the upgrade to upgrade the at least one relevant virtual resource.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method comprising:
instantiating a virtual management module hosted in a cloud based infrastructure of computer system physical resources in the cloud comprising a memory or access to a memory;
instantiating a plurality of virtual resources hosted in the cloud based infrastructure of computer system physical resources that support a cloud based application, wherein each virtual resource is operable to provide a functionality that supports performance of the cloud based application and has an internet protocol (IP) address, and a role, and in response to instantiation transmits to the management module the IP address and role;
wherein the management module:
stores in the memory the IP addresses and roles that the management module receives from instantiated virtual resources;
searches the memory to provide a first instantiated virtual resource with a second instantiated virtual resource from which to provide data that the first resource requires to provide the functionality that the first resource provides the cloud based application; and
operates to provide the first resource with the IP address of the second resource in real time during provision of the cloud based-application as virtual resources of the plurality of resources of the cloud based-application are instantiated to enable the first resource to communicate with the second resource and receive the data that the first resource requires.

2. The method according to claim 1 wherein the management module is configured to monitor the cloud based application of virtual resources after orchestration of the infrastructure to determine if a resource is added to or retired from the cloud based application.

3. The method according to claim 2 wherein the management module is configured in response to determining that a virtual resource has been added to the cloud based application, to search the memory to identify a virtual resource from which to provide the added virtual resource with data that the added virtual resource requires, and provide the added virtual resource with the IP address of the identified virtual resource for use in addressing a request for the data forwarded to the identified virtual resource.

4. A method comprising:
instantiating a virtual management module hosted in a cloud based infrastructure of computer system physical resources in the cloud comprising a memory or access to a memory;
instantiating a plurality of virtual resources hosted in the cloud based infrastructure of computer system physical resources that support a cloud based application, wherein each resource is operable to provide a functionality that supports performance of the cloud based application and has an internet protocol (IP) address, and a role, and in response to instantiation transmits to the management module the IP address and role;
wherein the management module:
stores in the memory the IP addresses and roles that the management module receives from instantiated virtual resources;
searches the memory to provide a first instantiated virtual resource with a second instantiated virtual resource from which to provide data that the first resource requires to provide the functionality that the first resource provides the cloud based application;

operates to provide the first resource with the IP address of the second resource to enable the first resource to communicate with the second resource and receive the data that the first resource requires; and instantiates at least one virtual monitoring agent configured to monitor workload of a virtual resource of the plurality of virtual resources and provide the virtual management module with data characterizing the workload.

5. The method according to claim 4 and comprising configuring the virtual management module to:

determine if the workload characterizing data received from the agent indicates that the workload departs from an acceptable workload range; and if the workload is determined to depart the acceptable workload range initiate a scaling operation to modify the cloud based application and return the workload to an acceptable workload range.

6. The method according to claim 5 and configuring the virtual management module to determine if the workload is within an acceptable workload range based on a value of at least one quality of service (QoS) parameter.

7. The method according to claim 1 and comprising instantiating at least one virtual upgrader comprising a dynamic address book configured to receive and store addresses of virtual resources of the plurality of virtual resources and configuring the virtual upgrader to manage an upgrade of a virtual resource having an address in the dynamic memory.

8. The method according to claim 7 and comprising configuring the virtual management module to:

monitor a site that provides data and/or programming upgrades relevant to virtual resources;

select an upgrade from the monitored upgrades relevant to at least one of the plurality of virtual resources in the cloud based application;

provide the at least one virtual upgrader with the upgrade and the address of the at least one virtual resource for which the upgrade is relevant; and instruct the at least one virtual upgrader to use the upgrade to upgrade the at least one relevant virtual resource.

9. The method according to claim 8 wherein providing the at least one virtual upgrade comprises providing the virtual upgrader with information identifying the upgrade and a site at which to receive the upgrade.

10. The method according to claim 1 and comprising configuring the virtual management module to provide service discovery and provide a given resource of the plurality of resources with an alternative or additional IP address and/or port at which the given resource may access a needed service.

11. The method according to claim 1 wherein instantiating a virtual management module and a plurality of virtual resources comprises providing a master template having templates for the management module and the virtual resources.

12. The method according to claim 1 wherein the plurality of virtual resources comprises at least one virtual machine (VM) and/or at least one container.

13. The method according to claim 12 wherein the cloud based application comprises at least one bare-metal resource.

14. A cloud based infrastructure comprising:

a plurality of virtual resources hosted in a cloud based infrastructure of computer system physical resources; and a virtual management module hosted in the cloud based infrastructure and having a non-transitory memory and a processor that:

communicates with virtual resources of the plurality of virtual resources after they are instantiated to receive their respective IP addresses, at which they are accessible for communications, and roles;

stores in the memory the received IP addresses and roles;

based at least in part on instantiation of a first virtual resource of the plurality of virtual resources, searches the memory to identify an IP address of second virtual resource from which to provide data that the first virtual resource requires;

provides the IP address of the second virtual resource to the first virtual resource to enable the first virtual resource to address a request to the second virtual resource for the data that the first resource requires;

receives data characterizing workload of a virtual resource of the plurality of virtual resources;

determines if the workload indicates that the workload departs from an acceptable workload range; and if the workload is determined to depart the acceptable workload range initiates a scaling operation to modify the cloud based infrastructure and return the workload to an acceptable workload range.

15. The cloud based infrastructure according to claim 14 wherein the virtual management module is configured to perform the search in real time during orchestration of the infrastructure as virtual resources of the infrastructure are instantiated.

16. The cloud based infrastructure according to claim 14 wherein the virtual management module is configured to monitor the infrastructure after the infrastructure is orchestrated to determine whether a new virtual resource is added to or removed from the infrastructure.

17. The cloud based infrastructure according to claim 16 wherein the virtual management module is configured upon determining that a new virtual resource has been added to the infrastructure, to search the memory to identify an IP address of a virtual resource, from which to provide the new virtual resource with data and provide the IP address to the new virtual resource for use by the new virtual resource as a destination address of a request for the data.

18. The cloud based infrastructure according to claim 14 wherein the plurality of virtual resources comprises at least one virtual monitoring agent configured to monitor workload of a the virtual resource of the plurality of virtual resources and provide the virtual management module with the data characterizing the workload.

19. The cloud based infrastructure according to claim 14 and comprising least one virtual upgrader having a dynamic address book configured to receive and store addresses of virtual resources of the plurality of virtual resources and configured to manage an upgrade of a virtual resource having an address in the dynamic memory, wherein the virtual management module is configured to:

monitor a site that provides data and/or programming upgrades relevant to virtual resources;

select an upgrade from the monitored upgrades relevant to at least one of the plurality of virtual resources in the infrastructure;

provide the at least one virtual upgrader with the upgrade and the address of the at least one virtual resource for which the upgrade is relevant; and instruct the at least one virtual upgrader to use the upgrade to upgrade the at least one relevant virtual resource.

\* \* \* \* \*